United States Patent Office 3,595,628
Patented July 27, 1971

3,595,628
APPARATUS FOR REFORMING HYDROCARBONS
John M. Connor, New York, N.Y., and Bernard C. Walton, West Orange, N.J., assignors to Chemical Construction Corporation, New York, N.Y.
Filed Nov. 26, 1968, Ser. No. 778,940
Int. Cl. B01j 9/04
U.S. Cl. 23—288         4 Claims

ABSTRACT OF THE DISCLOSURE

An improved secondary reformer is provided for use in conjunction with a primary reformer, for the catalytic conversion of fluid hydrocarbon by reaction with steam and air into a crude synthesis gas principally containing hydrogen carbon monoxide and nitrogen, which is suitable after further processing for usage in ammonia synthesis or the like. The apparatus features a separate refractory-lined reaction chamber for reaction of the primary reformer effluent gas stream with air, prior to passing the resulting intermediate process gas stream to secondary reforming. The primary reformer effluent transfer pipe, air inlet pipe, reaction chamber and transfer duct between the reaction chamber and the secondary reformer are coaxially aligned to provide uni-directional linear thermal expansion, which thus provides for stress-free operation of the apparatus combination.

BACKGROUND OF THE INVENTION

Field of the invention

The invention relates to the reforming of fluid hydrocarbons, such as methane, natural gas principally containing methane, or vaporized petroleum naphtha, to produce crude synthesis gas for ammonia synthesis or the like. The fluid hydrocarbon is catalytically reacted with steam in a primary reformer, and the primary reformer effluent is reacted with air to produce a high temperature intermediate process gas stream, which is passed to catalytic secondary reforming, to produce a crude synthesis gas principally containing hydrogen, carbon monoxide and nitrogen.

Description of the prior art

The general practice in the art of secondary reforming entails the passage of the primary reformer effluent and process air into the secondary reformer vessel as separate streams, which mix and react in the secondary reformer vessel immediately prior to passing through the secondary reformer catalyst bed. This basic procedure is shown in U.S. Pats. Nos. 3,262,758 and 3,190,730. Various configurations of primary steam reformers provided with internal vertically oriented catalyst-filled reformer tubes are shown in U.S. Pats. Nos. 3,119,671; 3,129,065; 3,127,248; 3,172,-739; 3,215,502 and 3,334,971 and U.S. patent application No. 466,984 filed June 25, 1965 and now issued as U.S. Pat. No. 3,419,362 on Dec. 31, 1968. An improved apparatus for transferring the hot effluent gas stream from a primary reformer to a secondary reformer is shown in U.S. Pat. No. 3,355,362, while another arrangement for transfer of process gas from a primary reformer to a secondary reformer is shown in U.S. patent application No. 589,946, filed Oct. 27, 1966 and now issued as U.S. Pat. No. 3,450,507 on June 17, 1969. An improved burner for reacting process air with the primary reformer effluent in the secondary reformer is disclosed in U.S. patent application No. 494,792 filed Oct. 11, 1965 and now issued as U.S. Pat. No. 3,450,504 on June 17, 1969, while a transfer line burner is shown in Canadian Pat. No. 793,-748. An arrangement of refractory shapes within the secondary reformer for internal exothermic reaction of process air and primary reformer effluent, and for subsequent uniform distribution of the resulting high temperature gas stream to the catalyst bed in the secondary reformer, is disclosed in U.S. patent application No. 439,601 filed Mar. 15, 1965 and now issued as U.S. Pat. No. 3,467,504 on Sept. 16, 1969.

One of the principal problems in design of reforming apparatus involves the development of stresses, and equipment failure, due to differential thermal expansion between the several connected apparatus elements and the connecting pipeline. Another problem involves the attainment of uniform and complete reaction between process air and the primary reformer effluent, in order that a fully reacted gas stream of uniform composition is passed into the secondary reformer catalyst bed.

SUMMARY OF THE INVENTION

In the present invention, a separate refractory-lined chamber is provided between the primary reformer and the secondary reformer, and the process air and primary reformer effluent gas streams are passed into the reaction chamber and react prior to passing into the secondary reformer, with resultant elevation of the gas stream temperature level due to reaction of oxygen from the air with combustible components of the primary reformer effluent taking place in the reaction chamber. The resultant uniformly mixed and reacted process gas stream is then passed into the lower section of the secondary reformer. The air inlet pipe is also coaxial with the primary ted into portions by refractory shapes and rows of refractory brick prior to passing into the catalyst bed. The reaction chamber is typically a horizontally oriented cylindrical vessel, with the primary reformer effluent being passed into the inlet end of the vessel via a coaxial pipe which extends from a lower manifold in the primary reformer. The air inlet pipe is also coaxial with the primary effluent inlet pipe, and is centrally and concentrically disposed within the effluent inlet pipe, so that the primary reformer effluent flows into the reaction chamber through the annular passage between the pipes. The central horizontal axis of the reaction chamber and pipes intersects the vertical axis of the secondary reformer vessel in a typical embodiment of the invention, so that displacement due to thermal deformation takes place along these axes and thermal stress due to relative differential expansion is prevented. The entire apparatus combination is lined with refractory material so that the metal shells are kept relatively cool and thermal expansion is relatively small. Also by virtue of the arrangement disclosed and the direct connection between the individual units the horizontal distance from the primary reformer manifold, which is free to move, and the secondary reformer vessel, which is anchored, is small. The entire apparatus combination expands horizontally towards the primary reformer outlet manifold, which is connected to the primary reformer tubes by individual pigtails, or other means, which readily absorb or transmit the thermal expansion, thus compensating for relatively small thermal elongation without stress. Another advantage of the present invention is that the separate reaction chamber effectively provides for complete reaction of the process air with the primary reformer effluent, so that a process gas stream of uniform composition and temperature is passed into the secondary reformer vessel, thus producing uniform catalytic reaction in the subsequent secondary reformer catalyst bed without the development of hot spots or reduced final reforming of the fluid hydrocarbon component of the process gas stream.

It is an object of the present invention to provide an improved apparatus for the catalytic reforming of fluid hydrocarbons with steam and air.

Another object is to provide an improved secondary reformer apparatus for the reaction of primary reformer effluent with air followed by catalytic secondary reforming.

A further object is to provide a combined primary and secondary reformer and waste heat boiler apparatus which is relatively free of thermal stress.

An additional object is to provide a secondary reformer apparatus and appurtenances thereto, which are relatively simple to fabricate and assemble.

Still another object is to provide a secondary reformer apparatus in which the process air and primary reformer effluent streams are completely reacted prior to passing the resulting process gas stream into the secondary reformer catalyst bed, so that a uniform gas stream of constant composition is passed into the catalyst bed.

These and other objects and advantages of the present invention will become evident from the description which follows.

DESCRIPTION OF THE DRAWINGS AND PREFERRED EMBODIMENTS

Referring now to the drawings.

Figure 1:
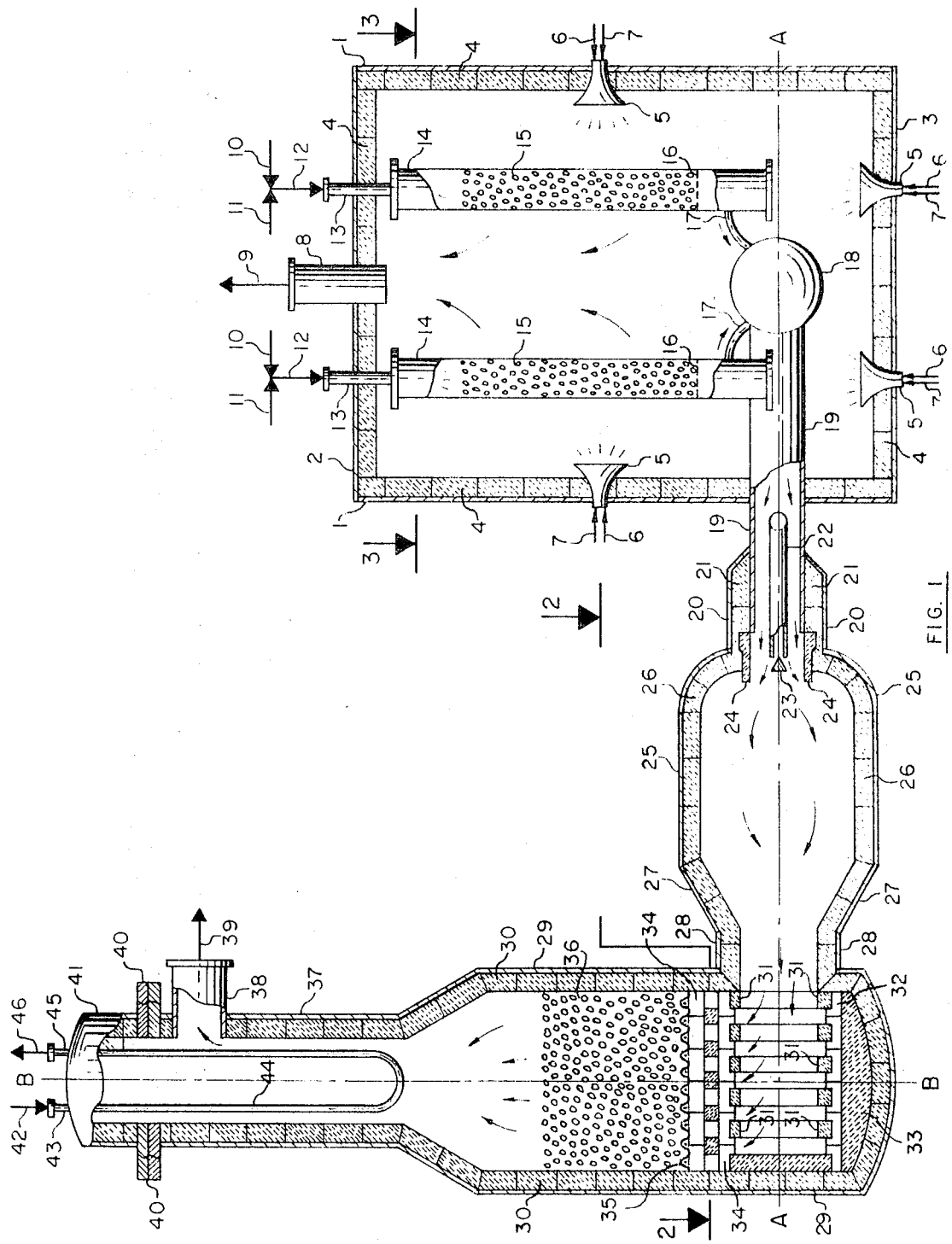
FIG. 1 is a sectional elevation view of the overall apparatus combination of the present invention.

Referring now to FIG. 1, the primary steam reformer unit is generally defined by side walls 1, top 2 and bottom 3. The primary reformer unit is generally a rectangular or vertically oriented cylindrical vessel, and is provided with internal refractory lining 4. A plurality of fluid hydrocarbon burners 5 are disposed in the side walls 1 and base or floor 3 of the reformer unit, and fluid hydrocarbon fuel streams 6 and combustion air streams 7 are passed into the burners 5. Combustion of streams 6 takes place within the primary reformer unit, with resultant generation of a highly elevated temperature within the unit. The generated flue gas produced by exothermic reaction of streams 6 and 7 is removed from the primary reformer via duct 8, which conducts the hot flue gas stream 9 to a suitable heat recovery means such as a waste heat boiler, not shown, which generates usable process steam.

Fluid hydrocarbon streams 10, which may consist of methane, natural gas principally containing methane, vaporized petroleum naphtha or other fluid hydrocarbon, are combined with process steam streams 11 to form primary reformer process feed streams 12, which are passed via inlet nozzles 13 into the upper ends of vertically oriented reformer tubes 14. An internal catalyst bed 15 is supported by lower grate or grid 16 in each tube 14, and the tubes 14 and beds 15 are heated to a highly elevated temperature by burners 5. The bed 15 in each tube 14 may consist of any suitable solid catalyst, composition or mixture for promoting the catalytic reaction of steam with a fluid hydrocarbon to produce hydrogen and carbon monoxide. Suitable catalysts for usage in bed 15 include nickel or cobalt or their reduced oxides, zirconia, chromia, molybdenum oxide or the catalysts described in U.S. Pat. No. 2,056,911. These catalysts may be deposited on a suitable carrier such as kaolin or alumina.

The resultant reacted process gas mixture discharged from each bed 15 below grate 16 now contains hydrogen, carbon monoxide, steam and unreacted hydrocarbon, The process gas mixture passes from the lower ends of tubes 14 via pigtails or curved pipes 17 into manifold 18, which is preferably a horizontally oriented cylindrical pipe or duct. A horizontal cylindrical pipe 19 conducts the process gas mixture from manifold 18, and the axis of pipe 19 is preferably aligned along the major apparatus axis A—A. Pipe 19 extends into the coaxial outer cylindrical housing 20, and a layer 21 of suitable refractory material such as refractory brick or cast refractory material is disposed in the annular space between pipe 19 and housing 20. A process air inlet pipe 22 is coaxially mounted within a portion of pipe 19. Pipe 22 is concentric with pipe 19 and the central axis of pipe 22 is oriented along axis A—A, so that the primary reformer effluent gas stream flows through the annular passage between pipes 22 and 19, and the central axis of pipe 22 is oriented along axis the outlet of pipe 22, with the axis of baffle 23 being oriented along axis A—A. The process air stream discharged from pipe 22 is deflected by baffle 23 into the annular primary reformer effluent gas stream, and the process air mixes and reacts exothermically with combustible components in the primary reformer effluent to produce a further rise in temperature. The reacting mixture impinges on outer refractory sleeve 24, which is thereby heated to incandescence, so that sleeve 24 promotes a uniform reaction.

The reacting mixture flows outwards and axially from sleeve 24 into the horizontally oriented cylindrical reaction chamber 25, which is provided with an inner refractory lining 26. Further reaction of the gas mixture takes place in unit 25, and a uniform gas stream is produced at a highly elevated temperature level within unit 25. The central horizontal axis of unit 25 is aligned along the major apparatus axis A—A. The reaction chamber 25 preferably terminates with a frusto-conical converging section 27, which extends to a horizontal process gas transfer duct 28. The elements 27 and 28 are preferably refractory-lined, and the central horizontal axis of elements 27 and 28 are aligned along axis A—A.

The duct 28 transfers the intermediate process gas stream, which is now at a uniform highly elevated temperature and has attained reaction equilibrium, from reaction chamber 25 horizontally into the lower end of the vertically oriented secondary reformer vessel 29, which is provided with inner refractory lining 30. The intermediate process gas stream is passed into unit 29 from duct 28 via a lower central passage defined by the central openings in the spaced apart and vertically oriented refractory shapes 31, which are preferably rectangular or square vertical shapes provided with a circular or oval central opening. The shapes 31 are supported on lower horizontal courses or rows of refractory brick 32, which in turn are mounted on a bottom cast refractory mass 33. The intermediate process gas stream flows inwards through the central horizontal passage defined by the central openings in shapes 31, and upwards between the spaced apart shapes 31. The gas stream next flows upwards between the staggered or spaced apart rows of refractory brick 34 with the parallel rows of brick 34 on each course or level of brick preferably being at right angles or perpendicular to the rows of brick in an adjacent course. The rising gas stream is thus divided into portions and uniformly distributed within the lower section of unit 29 by brick rows 34. The rising gas stream next flows upwards through wire screen or mesh 35, which rests on the upper rows of brick 34 and supports the secondary reform catalyst bed 36. The bed 36 consists of any suitable catalyst material for hydrocarbon reforming, and in most cases bed 36 will be similar in configuration and composition to beds 15 described supra. Further reaction of residual fluid hydrocarbon in the process gas stream with steam takes place in bed 36, with the requisite heat being furnished by sensible heat of the high temperature gas stream as previously formed in reaction chamber 25. The resultant fully reformed process gas stream discharged upwards from bed 36 within unit 29 now principally contains hydrogen, carbon monoxide, residual steam, carbon dioxide and nitrogen, and consists of a crude synthesis gas suitable for usage in ammonia synthesis or the like, after further processing of a conventional nature, not shown.

The rising hot synthesis gas above bed 36 is now preferably cooled in waste heat boiler section 37. Both secondary reformer vessel 29 and waste heat boiler 37 preferably consist of vertically oriented cylindrical containers which are coaxially aligned along a common vertical axis B—B, which perpendicularly intersects the major axis A—A within the lower portion of vessel 29. A crude synthesis gas outlet duct 38 is provided at the upper end of section 37, and duct 38 conducts the cooled crude synthesis gas to further processing, not shown, which typically includes catalytic water gas shift reaction of carbon monoxide with steam to produce further hydrogen and carbon dioxide, and carbon dioxide removal by scrubbing the gas stream with aqueous potassium carbonate solution or an ethanolamine solution, prior to passage of the final gas stream to ammonia synthesis.

The upper end of waste heat boiler section 37 is provided with a flanged connection 40 to waste heat boiler header section 41, which facilitates ready access and separate removal of the waste heat boiler coils. Boiler feed or condensate water stream 42 is passed via inlet nozzle 43 into waste heat boiler coil 44, which extends vertically through section 37 for heat recovery as vaporized steam. The resultant mixture of generated steam and residual water is removed from coil 44 via outlet nozzle 45 as stream 46, which is passed to a steam drum or other suitable device for separating the steam from residual liquid water, which may be recycled via stream 42.

Figure 2:
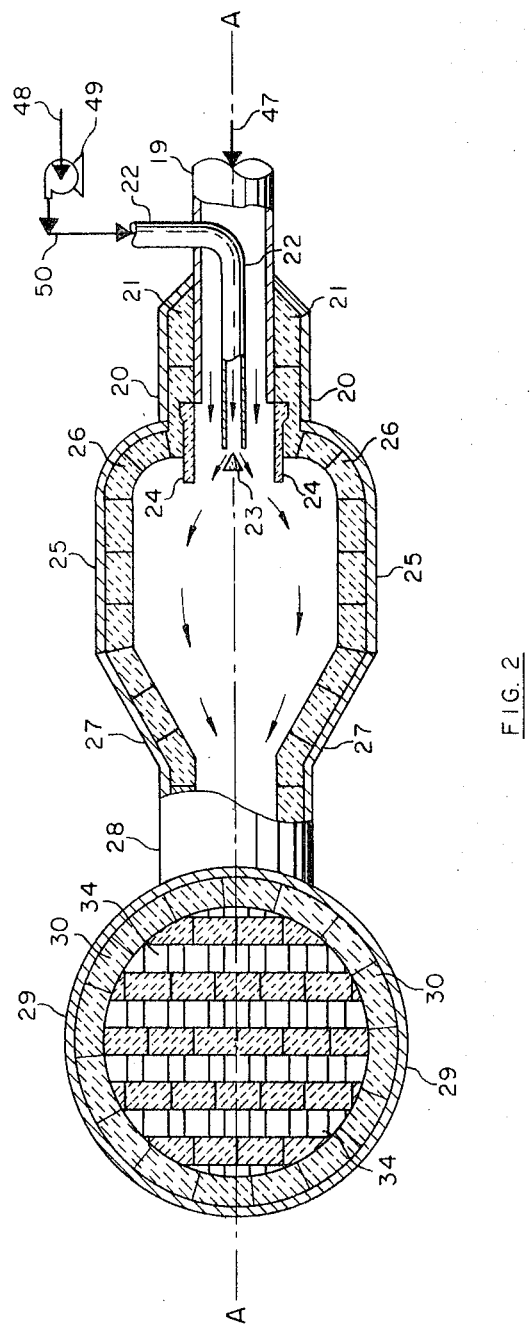
FIG. 2 is a sectional plan view of a portion of FIG. 1, taken on section 2—2.

Referring now to FIG. 2, the principal elements in the apparatus combination of the present invention are shown in sectional plan view, with the several elements 19, 22, 23, 24, 25, 27 and 28 being coaxilly aligned along the major axis A—A. The primary reformer effluent stream 47 is passed from the primary reformer unit manifold 18 to pipe 19. Process air stream 48 is pressurized or compressed by fan or blower 49, which discharges the air stream 50 into pipe 22, which extends into pipe 19 and thereafter curves to a coaxial alignment with pipe 19 along axis A—A.

Figure 3:
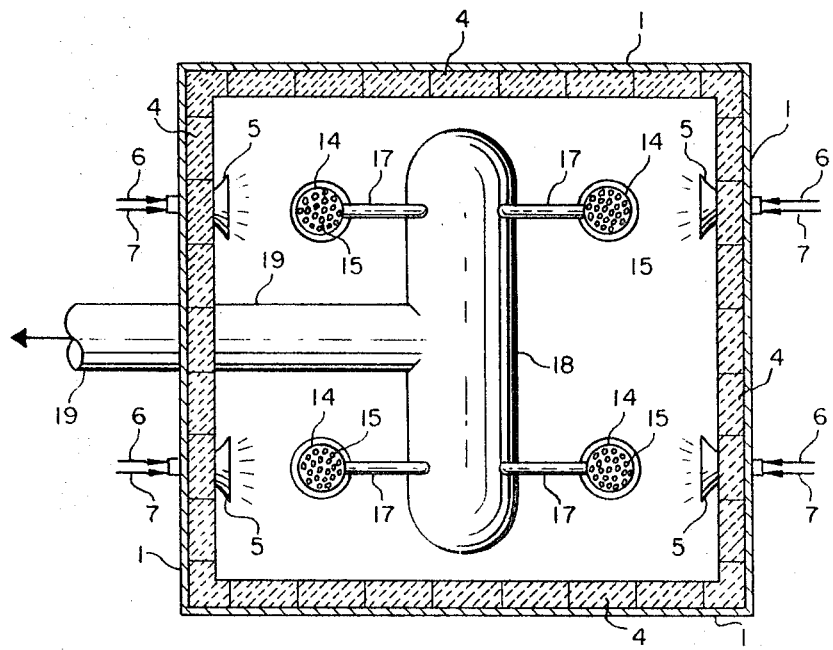
FIG. 3 is a section plan view of the primary reformer portion of FIG. 1, taken on section 3—3.
Figure 4:
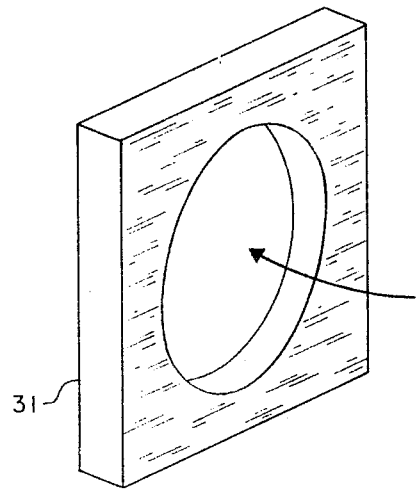
FIG. 4 illustrates a typical vertically oriented rectangular refractory shape provided with a central opening for passage of the intermediate process gas stream into the lower portion of the secondary reformer from the separate reaction chamber.

In operation of the apparatus of the present invention, the several apparatus elements which are coaxially aligned along axis A—A expand in a linear manner along axis A—A when thermally deformed or elongated, with horizontal displacement ultimately being accommodated by manifold 18 which is supported on flexible curved pipes or pigtails 17, as shown in FIG. 3. The individual elements 17 may displace to absorb the thermal expansion, or at least a portion of the expansion may be accommodated by lateral curvature of the lower portions of tubes 14, or pendulum-like displacement of tubes 14 about an upper axis.

Numerous alternatives within the scope of the present invention, besides those mentioned supra, will occur to those skilled in the art. The primary reformer unit may in practice consist of any of the apparatus configurations of patents mentioned supra, which have a common manifold for collection of primary reformer effluent. The provision of apparatus elements 23, 24, 31 and 34 in the apparatus constitute a preferred embodiment of the present invention, and other functionally equivalent apparatus configurations may be provided in practice. Alternative waste heat boiler arrangements integral with secondary reformer 29, or a separate waste heat boiler facility, may be provided in practice, however, the structural configuration of section 37 and its appurtenances constitutes a preferred embodiment of the invention, since the structural arrangement of alignment of the several units along axis B—B permits linear vertical displacement along axis B—B due to thermal elongation or deformation, without the development of stress or equipment failure due to relative thermal deformation, as has been encountered in the prior art.

We claim:

1. An apparatus for the catalytic reforming of fluid hydrocarbons with steam and air to produce synthesis gas which comprises a primary catalytic steam reformer, means to internally heat said primary catalytic steam reformer, said primary reformer including a plurality of vertically oriented catalyst-filled tubes, a horizontal manifold, and flexible connections, each of said flexible connections extending between the end of one of said tubes and said manifold, means to pass a process gas mixture containing steam and a fluid hydrocarbon through the tubes of said primary reformer at elevated temperature, whereby a portion of said fluid hydrocarbon component reacts with steam to form carbon monoxide and hydrogen in an effluent gas stream which flows through said flexible connections into said manifold, a refractory-lined reaction chamber, said reaction chamber being a horizontally oriented chamber disposed adjacent to the lower end of said primary reformer, a first pipe means to pass the effluent gas stream derived from said manifold within said primary reformer and principally containing unreacted fluid hydrocarbon, carbon monoxide, hydrogen and steam into said reaction chamber, a second pipe means to pass air into said reaction chamber, whereby said air reacts exothermically with said primary reformer effluent gas stream in said reaction chamber to produce an intermediate process gas stream at highly elevated temperature, a vertically oriented secondary reformer vessel, the lower portion of said secondary reformer vessel being adjacent to the outlet of said horizontally oriented reaction chamber, a bed of discrete catalyst particles disposed within said secondary reformer vessel, horizontal duct means to pass said intermediate process gas stream from said reaction chamber into said secondary reformer vessel below said catalyst bed, whereby said intermediate process gas stream rises through said catalyst bed and further fluid hydrocarbon component is thereby catalytically reformed by reaction with steam in said catalyst bed, said reaction chamber, first pipe means, second pipe means and horizontal duct means being coaxially aligned on a common horizontal axis which intersects the vertical axis of said vertically oriented secondary reformer vessel, and means above said catalyst bed to remove the resulting crude synthesis gas from said secondary reformer vessel.

2. The apparatus of claim 1, in which said first pipe means to pass the effluent gas stream from said primary reformer to said reaction chamber is a first linear horizontal pipe, said first pipe extending into said reaction chamber and terminating adjacent to the refractory lining at the inlet end of said reaction chamber, and said second pipe means to pass air into said reaction chamber is a second linear horizontal pipe, said second pipe being coaxial with a portion of said first pipe and concentrically disposed within a portion of said first pipe adjacent to said reaction chamber, and blower means to pass air through said second pipe, whereby said effluent gas stream flows into said reaction chamber through the annular passage defined between said second pipe and said first pipe.

3. The apparatus of claim 2, in which said reaction chamber is cylindrical, said horizontal duct means to pass said intermediate process gas stream from said reaction chamber into said secondary reformer vessel is a refractory-lined cylindrical duct, said duct extending from the outlet end of said reaction chamber to said secondary reformer vessel, and said reaction chamber, duct, first pipe and second pipe are coaxially aligned along said common horizontal axis.

4. An apparatus for the catalytic reforming of fluid hydrocarbons with steam and air to produce synthesis gas which comprises a primary catalytic steam reformer; said primary reformer comprising a vertically oriented refractory-lined container provided with a plurality of internal vertically oriented catalyst-filled reformer tubes, internal means in said container to externally heat said tubes, means to pass a portion of a process gas mixture containing steam and a fluid hydrocarbon downwards through each of said tubes, and a horizontal manifold adjacent to and connected with the lower end of each of said tubes by a flexible connection, whereby the effluent gas stream from said tubes flows into said manifold through the flexible connections; a refractory-lined horizontally oriented cylindrical reaction chamber; a first linear pipe, said first pipe extending from said manifold to the inlet end of said reaction chamber and being coaxial with said reaction chamber, whereby the effluent gas stream derived from said reformer and principally containing unreacted fluid hydrocarbon, carbon monoxide, hydrogen and steam is passed from said manifold into said reaction chamber; a second linear pipe, said second pipe being coaxial with a portion of said first pipe and concentrically disposed within a portion of said first pipe adjacent to said reaction chamber; blower means to pass air through said second pipe, whereby said air reacts exothermically with said effluent gas stream in said reaction chamber to produce an intermediate process gas stream at highly elevated temperature; a vertically oriented cylindrical secondary reformer vessel, the lower portion of said secondary reformer vessel being adjacent to the outlet of said horizontally oriented reaction chamber, whereby the vertical axis of said secondary reformer intersects an extension of the horizontal axis of said reaction chamber; a bed of discrete catalyst particles disposed within said secondary reformer vessel, a refractory-lined horizontal cylindrical duct, said duct being coaxial with said reaction chamber and extending from the outlet end of said reaction chamber to said secondary reformer vessel below said catalyst bed, whereby said intermediate process gas stream is passed from said reaction chamber through said duct and into said secondary reformer vessel below said catalyst bed, said intermediate process gas stream thereby rising through said catalyst bed to produce further catalytic reforming of fluid hydrocarbon component by reaction with steam in said catalyst bed; and means above said catalyst bed to remove the resulting crude synthesis gas from said secondary reformer vessel.

References Cited

UNITED STATES PATENTS

| | | | |
|---|---|---|---|
| 2,501,700 | 3/1950 | Stuart | 23—288X |
| 3,062,197 | 11/1962 | Fleischer. | |
| 3,190,730 | 6/1965 | Korwin et al. | 23—288 |
| 3,257,172 | 6/1966 | Kao et al. | 23—288X |
| 3,450,504 | 6/1969 | Korwin | 23—288X |
| 3,450,507 | 6/1969 | Korwin | 23—288N |
| 3,467,504 | 9/1969 | Korwin | 23—288 |

JOSEPH SCOVRONEK, Primary Examiner

U.S. Cl. X.R.

23—277, 288M

UNITED STATES PATENT OFFICE
CERTIFICATE OF CORRECTION

Patent No. 3,595,628  Dated July 27, 1971

Inventor(s) J. M. Connor and B. C. Walton

It is certified that error appears in the above-identified patent and that said Letters Patent are hereby corrected as shown below:

Column 2 line 28, delete ". The air inlet pipe is also coaxial with the primary" and insert ", below the catalyst bed, and is uniformly distribu-".

Column 4 line 11, delete ", and the central axis of pipe 22 is oriented along axis" and insert " . A conical dispersion baffle 23 is centrally disposed at "

Signed and sealed this 28th day of December 1971.

(SEAL)
ATTEST:

EDWARD M. FLETCHER, JR.  ROBERT GOTTSCHALK
Attesting Officer  Acting Commissioner of Patents